(12) United States Patent
Hayashi et al.

(10) Patent No.: US 7,156,414 B2
(45) Date of Patent: Jan. 2, 2007

(54) AIRBAG APPARATUS AND LID THEREOF

(75) Inventors: Shinji Hayashi, Shiga (JP); Yuki Kanno, Shiga (JP)

(73) Assignee: Takata Corporation, Tokyo (JP)

( * ) Notice: Subject to any disclaimer, the term of this patent is extended or adjusted under 35 U.S.C. 154(b) by 294 days.

(21) Appl. No.: 10/674,519

(22) Filed: Oct. 1, 2003

(65) Prior Publication Data

US 2004/0070181 A1   Apr. 15, 2004

(30) Foreign Application Priority Data

Oct. 10, 2002 (JP) ............................. 2002-297643
Jun. 30, 2003 (JP) ............................. 2003-187869

(51) Int. Cl.
*B60R 21/215* (2006.01)

(52) U.S. Cl. .................................. 280/728.3

(58) Field of Classification Search ............ 280/728.3, 280/731, 732
See application file for complete search history.

(56) References Cited

U.S. PATENT DOCUMENTS

| | | | |
|---|---|---|---|
| 4,148,503 A | * | 4/1979 | Shiratori et al. ............ 280/731 |
| 5,342,088 A | * | 8/1994 | Bauer ...................... 280/728.3 |
| 5,681,051 A | * | 10/1997 | Phillion ................... 280/728.3 |
| 5,863,062 A | * | 1/1999 | Harada et al. ............ 280/728.3 |
| 5,989,660 A | * | 11/1999 | Moriwaki et al. .......... 428/35.2 |
| 6,168,187 B1 | * | 1/2001 | Yamada et al. ........... 280/728.3 |
| 6,467,801 B1 | * | 10/2002 | Preisler et al. ............ 280/728.3 |
| 6,550,803 B1 | * | 4/2003 | Derrick .................... 280/728.3 |
| 6,929,280 B1 | * | 8/2005 | Yasuda et al. ............ 280/728.2 |

FOREIGN PATENT DOCUMENTS

| | | |
|---|---|---|
| JP | 04-051076 Y2 | 12/1992 |
| JP | 10-071906 A | 3/1998 |
| JP | 11-115669 A | 4/1999 |
| JP | 3070586 U | 5/2000 |
| JP | 2001-030862 A | 2/2001 |
| JP | 2001-180417 A | 7/2001 |

* cited by examiner

*Primary Examiner*—David R. Dunn
(74) *Attorney, Agent, or Firm*—Foley & Lardner LLP (57) ABSTRACT

A lid body for an airbag apparatus that can be torn along tear lines without generating hangnails. The lid body includes a lid body and a tear line disposed on a surface of the lid body. The tear line includes a center tear line extending in a lateral direction along the surface of the lid body, a left tear line continuing from a left end of the center tear line, and a right tear line continuing from a right end of the center tear line. The left tear line and the right tear line extend in directions of mutual intersection. Additionally, the angle of intersection between the left tear line and the center tear line is an acute angle, and the angle of intersection between the right tear line and the center tear line is an acute angle.

18 Claims, 11 Drawing Sheets

Prior Art

FIGURE 3

Prior Art

FIGURE 4

Prior Art

FIGURE-5

Prior Art

FIGURE 6

Prior Art

AIRBAG APPARATUS AND LID THEREOF

BACKGROUND

The present invention relates to an airbag apparatus to be mounted on a vehicle.

An airbag apparatus for protecting an occupant by deploying an airbag in case of emergency such as a collision is mounted on a motor vehicle or the like. For example, an airbag apparatus for a driver's seat is mounted in a steering wheel. An airbag apparatus for a front seat is mounted in front of the front seat.

The airbag apparatus includes a folded airbag, a gas generator for deploying the airbag, and a lid body for covering the airbag. In the case of the airbag apparatus for a front seat, the airbag is stored in a container member, which is referred to as the container or retainer, and a front opening of the container member is covered by the lid body. The lid body of the airbag apparatus for a front seat may be an instrument panel itself, or may be a plate member, which is generally referred to as the lid, cover, deployment door, module cover, and the like, formed separately from the instrument panel. The lid body of the airbag apparatus for a driver's seat is referred to as the module cover in many cases. The lid body is formed of synthetic resin such as polypropylene. The superficial skin of a material such as polyvinyl chloride or thermoplastic polyurethane may be provided in two colors.

Generally, the lid body for the airbag apparatus is formed with a tear line for making the lid body tear when the airbag is deployed. The tear line is, in many cases, constructed of a groove provided on the back surface of the lid body. The tear line may include a center tear line extending laterally with respect to the occupant, and a left tear line and a right tear line continuing from the left and right ends of the center tear line both for the airbag for a driver's seat and the airbag for a front seat.

Figure 2:
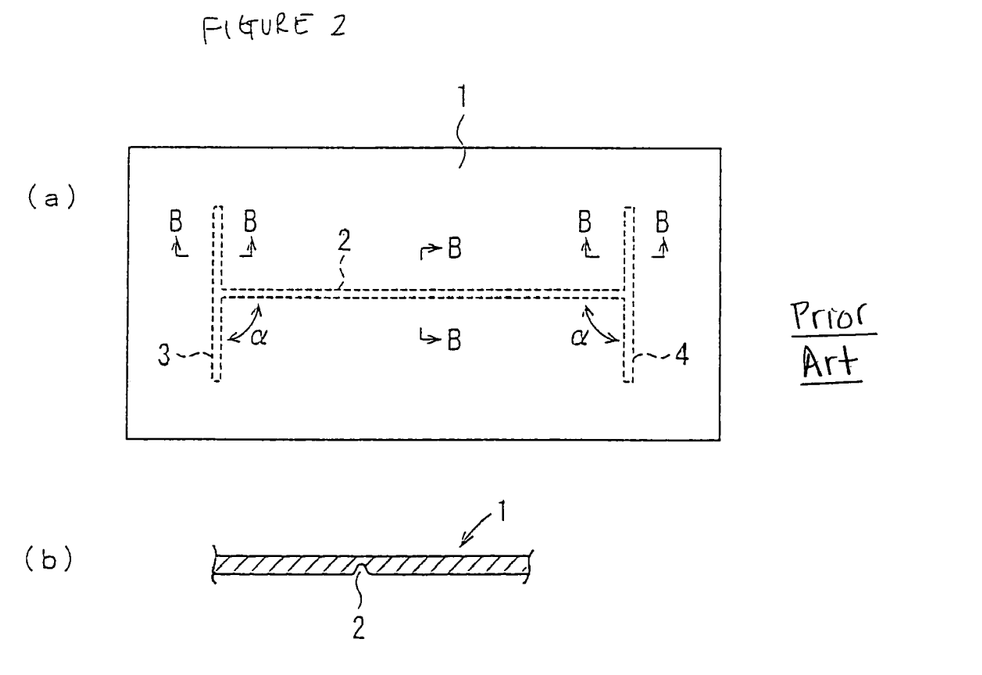
FIG. 2(a) shows a front view of a lid of an airbag apparatus for a front seat.
FIG. 2(b) shows a cross-sectional view taken along the line B—B in FIG. 2(a).
Figure 3:
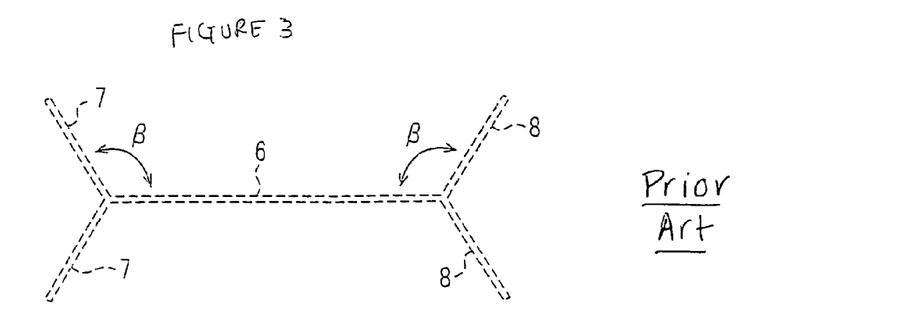
FIG. 3 is a front view of the center portion of a lid having tear lines of different shapes.
Figure 4:
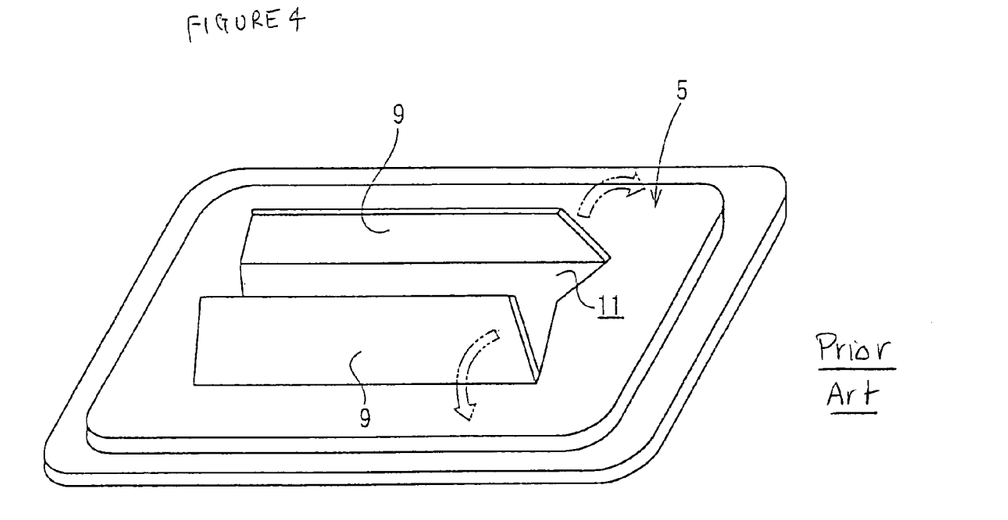
FIG. 4 is a perspective view showing the tear line of FIG. 3 in a torn state.
Figure 5:
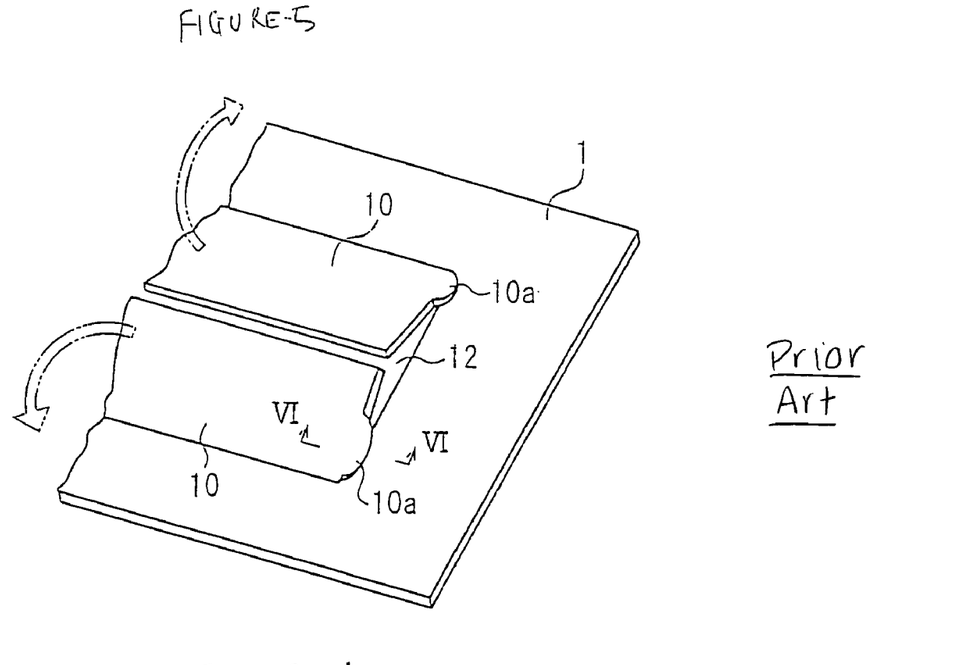
FIG. 5 is a perspective view showing the tear line of FIG. 2 in a torn state.
Figure 6:
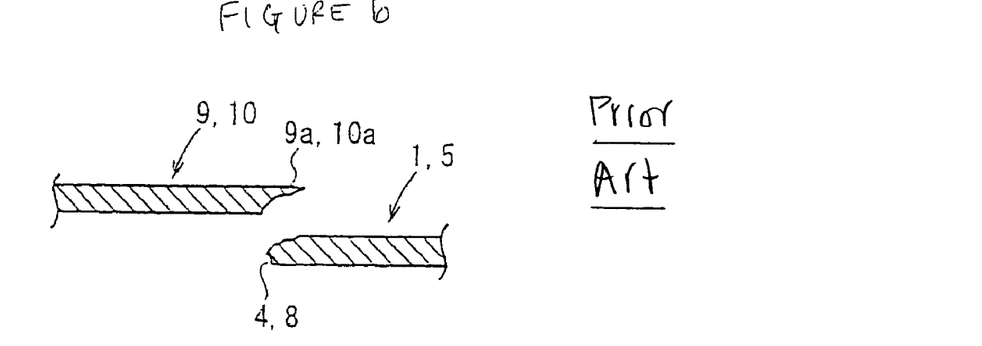
FIG. 6 is a cross sectional view taken along the line VI—VI in FIG. 5.

FIGS. 2, 3, and 4 show constructions of tear lines in the related art. FIG. 2(a) is a front view of a lid for an airbag apparatus for a front seat; FIG. 2(b) is a cross-sectional view taken along the line B—B in FIG. 2(a); FIG. 3 is a front view of a lid having a tear line of a different shape, showing the portion at the center thereof, and FIG. 4 shows the tear line in FIG. 3 in a torn state. FIG. 5 shows the tear line in FIG. 2 in a torn state, and FIG. 6 is a cross sectional view taken along the line VI—VI in FIG. 5.

The tear line on a lid 1 in FIG. 2(a) is constructed in such a manner that intersecting angles cc of a left tear line 3 and a right tear line 4 with respect to a center tear line 2 are right angles. As shown in FIG. 2(b), the tear line is formed by providing a groove on the back surface of the lid 1.

In lid 5 shown in FIG. 3 and FIG. 4, intersecting angles β of a left tear line 7 and a right tear line 8 with respect to a center tear line 6 are obtuse angles (Japanese Utility Model Registration No. 3070586, incorporated by reference herein).

When the airbag is deployed with gas supplied from a gas generator in case of collision of the vehicle, the lids 1, 5 are pushed by the airbags from the backsides, are torn along the tear lines, and open toward the front. When the lids 1, 5 are torn along the center tear lines 2, 6 and the left and the right tear lines 3, 4, 7, 8 as shown in FIGS. 4 and 5, flaps 9, 10 are formed. When these flaps 9, 10 are opened toward the front, openings 11, 12 are formed. The airbags are deployed in front of the occupants to a large extent through the openings 11, 12 and protect the occupants.

As a result of various investigations, when the lid bodies in the related art as shown in FIGS. 2–5 are torn along the tear lines in association with deployment of the airbag, it was found that "hangnails" are generated along the left tear lines and the right tear lines. In other words, as shown in FIG. 6, the lid bodies 1, 5 are torn not only along the tear lines, but the flaps 9, 10 are opened along with the front sides of the adjacent areas, which results in generation of hangnails 9a, 10a like weld flashes on the flaps 9, 10.

Accordingly, there remains a need for a lid body for an airbag apparatus which is torn along tear lines without generating hangnails as described above and an airbag having such lid body.

SUMMARY OF THE INVENTION

According to an embodiment of the present invention, a lid body for an airbag apparatus is provided. The lid body includes a tear line. The tear line has a center tear line extending in the lateral direction with respect to an occupant and a left tear line and a right tear line continuing from the left and right ends of the center tear line and extending in the direction intersecting therewith. The intersecting angles θ of the left tear line and the right tear line with respect to the center tear line are acute angles.

In the lid body for an airbag apparatus as described above, it was found that no hangnail was generated along the left and right tear lines when being torn along with deployment of the airbag.

In particular, when the relation between the intersecting angles $\theta_1$, $\theta_3$ of the left tear line and the right tear line on the windshield side of the center tear line and the intersecting angles $\theta_2$, $\theta_4$ of the left tear line and the right tear line on the occupant side of the center tear line are such that $\theta_1+\theta_2$ and $\theta_3+\theta_4$ are 60° or larger but less than 180°, hangnails were certainly prevented from being generated.

According to another embodiment of the present invention, the intersection angles $\theta_1$, $\theta_3$ on the windshield side of the center tear line may differ from the intersection angles $\theta_2$, $\theta_4$ on the occupant side of the center tear line.

In this case, it is preferable that $\theta_1$ and $\theta_3$ are substantially equal, $\theta_2$ and $\theta_4$ are substantially equal, and $\theta_1$ and $\theta_3$ are smaller than $\theta_2$ and $\theta_4$.

Preferably, the tear line is constructed of a groove provided on the back surface of the lid body.

According to another embodiment of the present invention, the airbag apparatus includes an airbag, a unit for deploying the airbag, and a lid for covering the airbag, and a lid body according to the present invention is provided.

Another embodiment of the present invention includes an airbag apparatus constructed in such a manner that a square case surrounding an opening enclosed by the tear lines of the lid body is disposed on the backside of the lid body. An inner member having a main surface portion joined to the lid body and a leg strip extending upright from the main surface portion and overlapped with the inner surface of the case is disposed inside the case. Overhanging strips overhanging inwardly of the case are provided at the corners of the case on the lid body side. The main surface portion of the inner member is disposed only on the side of the center of the case with respect to the overhanging strips. The main surface portion is provided with a tear line overlapping the center tear line on the lid body, and the right tear line and the left tear line of the lid body are extended so as to overlap the overhanging strips.

In the case of the airbag apparatus in this arrangement, when the airbag starts to deploy, the airbag presses the main surface portion of the inner member and the lid body from the backside thereof. Thus, the main surface portion and the lid body are torn along the tear lines, thereby being opened toward the cabin in the flap-shape so that the airbag is deployed in the cabin.

Since the flap-shaped portions of the lid body (hereinafter referred to as flap portion) are adhered with the flap portions of the inner member over the major part thereof, and thus are reinforced by lining, high-strength is ensured. Therefore, even when a large force is exerted on the flap portions when they start to open, they are prevented from being broken.

The area of the flap portions formed on the lid body in the vicinity of edges on the left and right ends are not lined. However, according to the mode of this embodiment, since the area which is not lined (hereinafter referred to as single-layer area of the flap) is small, the flaps are not broken even when a large force is exerted thereto.

In other words, in the mode according to this embodiment, since the overhanging strips are provided at four corners of the case, and the left and the right tear lines on the lid body extend across the overhanging strips, the area of the flap portions of the lid body running outward (rightward or leftward) over the frame-shaped case is small. Since the area of the flap potions running outward over the case is the single-layer area of the flap, the single-layer area of the flap is small according to the present invention.

The overhanging strips overhang toward the center of the frame-shaped case, and thus the airbag is brought into friction so as to be stuck thereon when the airbag is deployed, and thus a large force is exerted thereon. Therefore, preferably, a rib for reinforcing the overhanging strip is provided. According to an embodiment of the invention, when a substantially triangular shaped plate connecting the backside of the overhanging strip and the inner surface of the case is provided as the rib, so that the hypotenuse of the triangle obliquely intersects both with the backside of the overhanging strip and the inner surface of the case, the airbag that is being deployed is guided toward the center of the frame-shaped case by the rib, whereby the airbag hardly gets stuck on the overhanging strip, and thus the airbag can smoothly be deployed.

It is to be understood that both the foregoing general description and the following detailed description are exemplary and explanatory only and are not restrictive of the invention claimed.

BRIEF DESCRIPTION OF THE DRAWINGS

These and other features, aspects, and advantages of the present invention will become apparent from the following description, appended claims, and the accompanying exemplary embodiments shown in the drawings, which are described briefly below.

DETAILED DESCRIPTION

Embodiments of the present invention will be described below with reference to the accompanying drawings.

Figure 1:
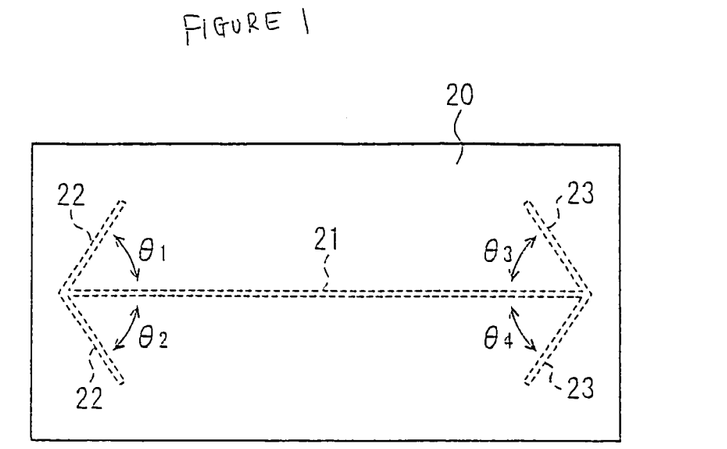
FIG. 1 is a front view of a lid body according to an embodiment of the present invention.

An embodiment and a comparative example of the present invention are described as follows. The lids 20, 1, 5 shown in FIGS. 1, 2, 4 were formed of polypropylene by injection molding. The thickness of the lid was 3.5 mm, and the depth of the grooves constituting the tear lines was 0.15 mm. The length of the center tear line was 278 mm in FIG. 1, 278 mm in FIG. 2, and 235 mm in FIG. 3. The distance between the upper and lower ends of the left and the right tear lines was 55 mm. The intersecting angles are as follows:

$$\theta=\theta_1=\theta_2=\theta_3=\theta_4=68°$$

$$\alpha=90°$$

$$\beta=109°$$

An airbag for a front seat of 120 liters in capacity was folded and stored in a container, and the respective lids were mounted to constitute an airbag apparatus for a front seat. The frequency of generation of "hangnails" of more than 2.5 mm in width when the airbag was deployed with a gas generator was measured. The results are as follows: 0% in the case of FIG. 1, 50% in the case of FIG. 2, and 100% in the case of FIG. 3.

As is clear from the embodiments and the comparative examples, according to the present invention, a lid that can be torn accurately along the tear line and an airbag apparatus provided with the lid are provided.

FIG. 1 is a front view of a lid as a lid body for an airbag apparatus for a front seat according to an embodiment of the present invention.

A lid 20 is a substantially rectangular plate extending laterally when viewed from an occupant sitting on a front seat. The lid 20 is formed with a center tear line 21 extending in the lateral direction, a left tear line 22 and a right tear line 23 continuing from the left and the right ends of the center tear line 21. The tear lines 21 to 23 are constructed of grooves formed on the back surface of the lid 20. The left tear line 22 and the right tear line 23 extend upwardly or forwardly of the vehicle and downwardly or rearwardly of the vehicle from the center tear line 21.

The intersecting angles $\theta(\theta_1, \theta_2, \theta_3, \theta_4)$ of the left and right tear lines 22, 23 with respect to the center tear line 21 are all acute angles, and preferably, $\theta_1+\theta_3$, $\theta_2+\theta_4$ are 60° or larger, but smaller than 180°. The angles $\theta_1$ to $\theta_4$ may be all the same angle or may be different.

According to an embodiment of the present invention, preferably, when the intersecting angles $\theta_1$, $\theta_3$ on the windshield side of the center tear line differ from the intersecting angles $\theta_2$, $\theta_4$ on the occupant side of the center tear line, the angles $\theta_1$ and $\theta_3$ are substantially the same, the angles $\theta_2$ and $\theta_4$ are substantially the same, and the angles $\theta_1$ and $\theta_3$ are smaller than the angles $\theta_2$ and $\theta_4$. The term "substantially the same" means that a difference within ±2° is allowed.

The lid 20 is preferably formed of synthetic resin such as polypropylene. A superficial skin of a material such as polyvinyl chloride or thermoplastic polyurethane may be provided on the surface thereof.

In the airbag apparatus for a front seat having the lid 20 thus constructed, when the gas generator is actuated and the airbag is deployed, the lid 20 is torn along the tear lines 21, 22, 23 by being pressed by the airbag, and an opening is generated on the lid 20. Therefore, the airbag deploys through the opening toward the front of the occupant sitting on the front seat.

Figure 7:
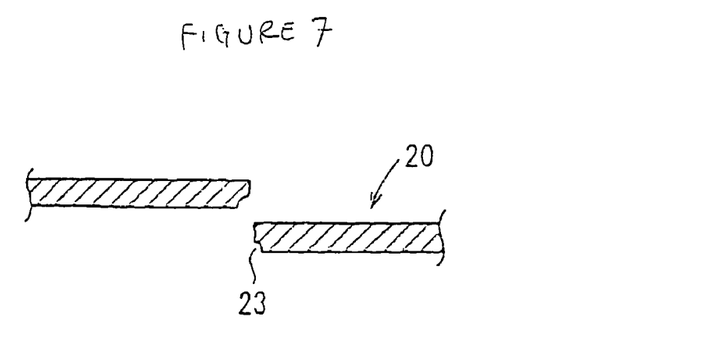
FIG. 7 is a cross sectional view of a torn lid body according to an embodiment of the present invention.

In this embodiment, since the intersecting angles $\theta$ are acute angles, when the left and the right tear lines 22, 23 are torn and the flaps are opened, no hangnail is generated along the flaps, and the lid 20 is torn along the tear lines 21, 22, 23 accurately as shown in FIG. 7.

Though the above-described embodiment relates to a lid, the lid body may be, for example, an instrument panel. Alternatively, it may be applied to a lid body (module cover) for an airbag apparatus for a driver's seat according to the present invention.

In the above-described embodiment, though the left and right tear lines 22, 23 extend both upward and downward of the center tear line 21, it may extend only one of upward and downward.

Referring to FIGS. 8–14, an airbag apparatus according to an embodiment of the present invention will be described.

Figure 8:
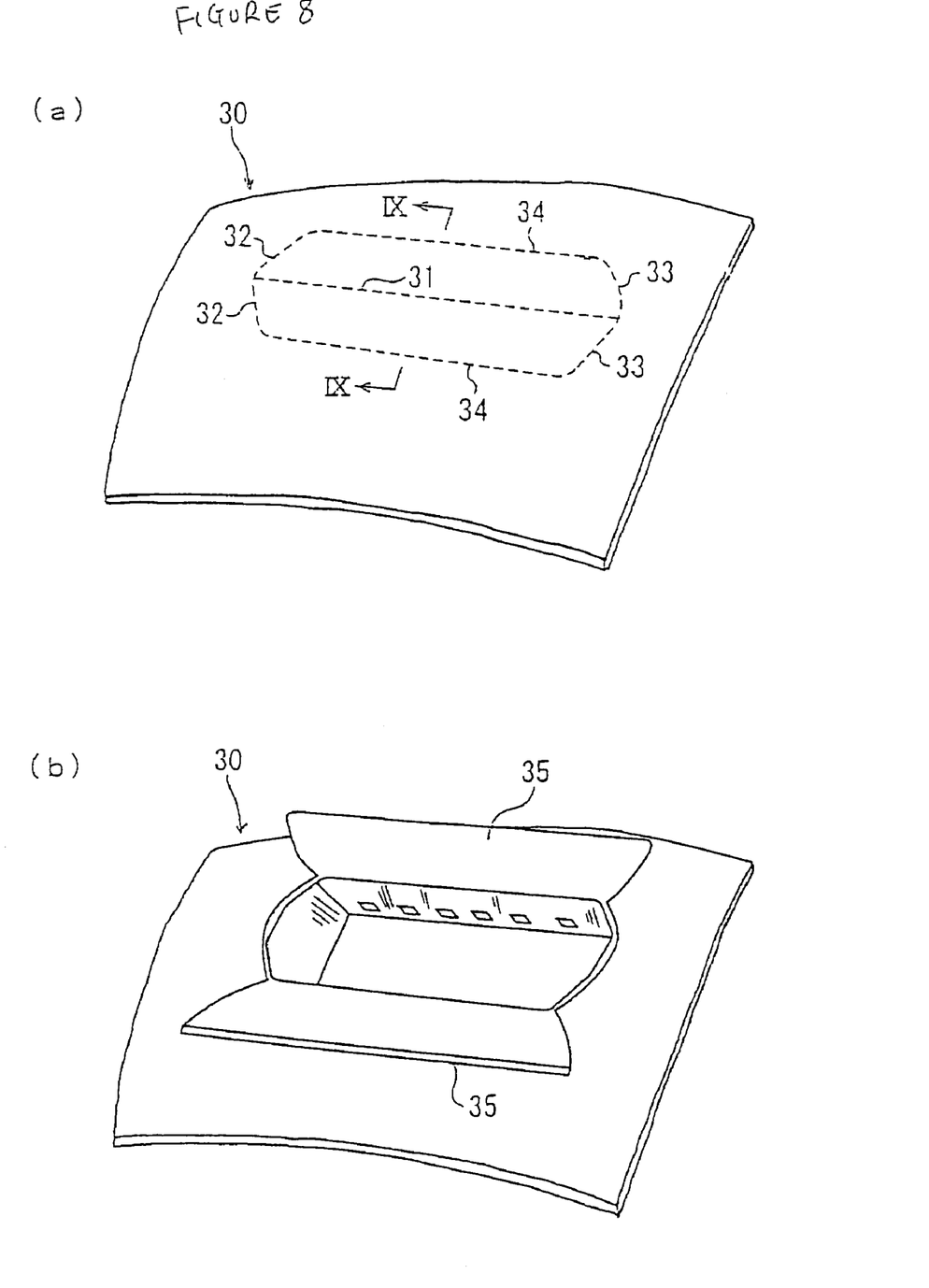
FIG. 8(a) is a perspective view of an airbag according to an embodiment of the present invention.
FIG. 8(b) is a perspective view or the airbag of FIG. 8(a) in which flaps are open.
Figure 9:
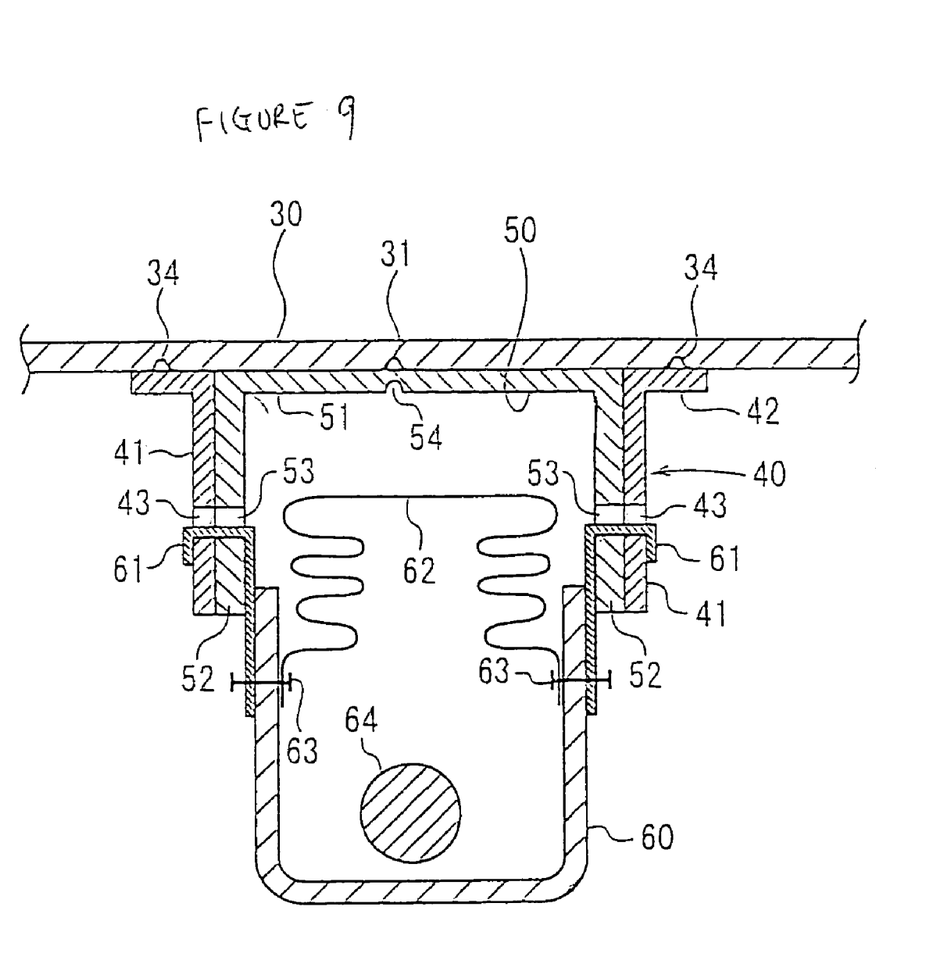
FIG. 9 is a cross-sectional view taken along the line IX—IX in FIG. 8(a).
Figure 10:
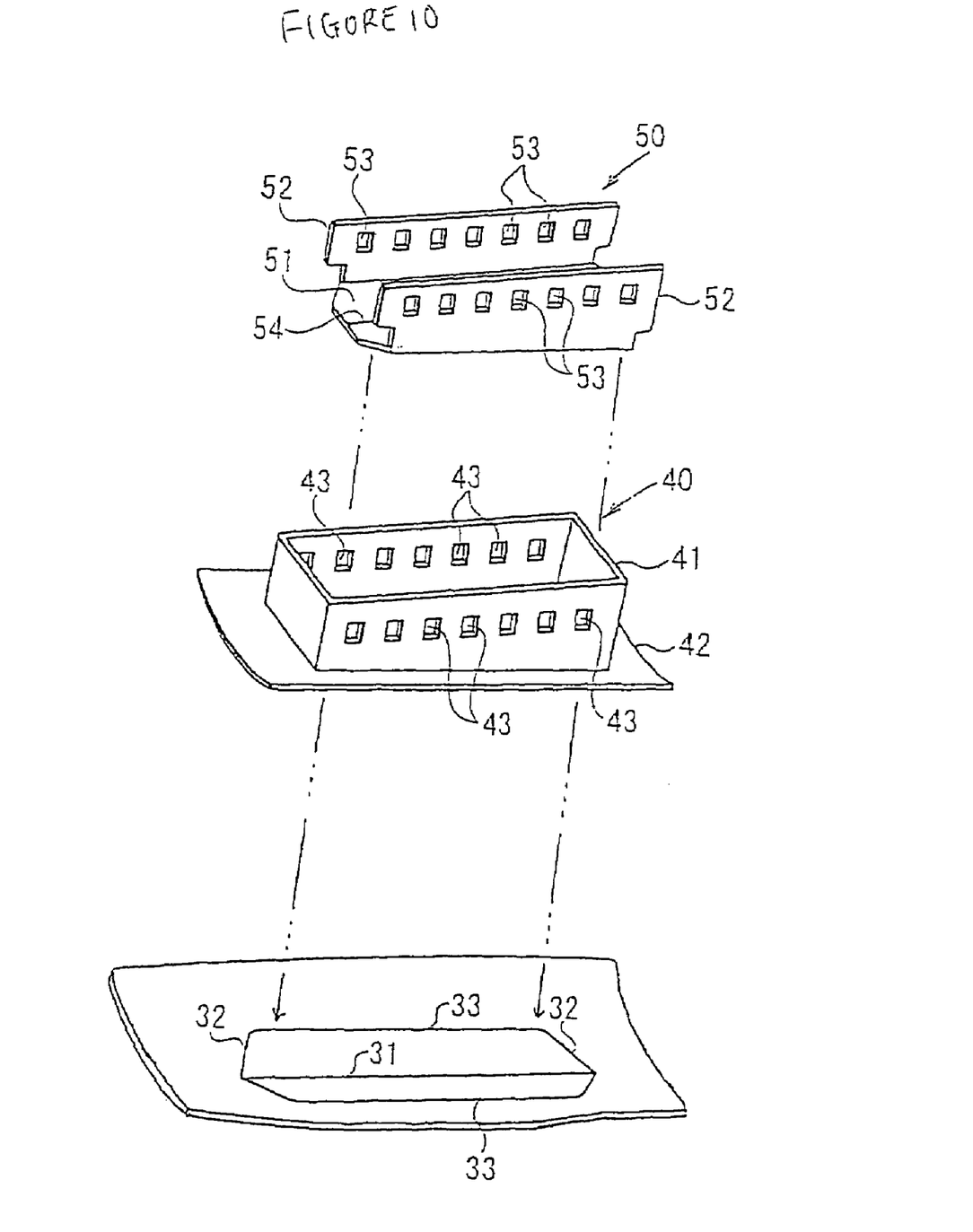
FIG. 10 is an exploded perspective view showing a construction of the airbag apparatus according to an embodiment of the present invention.

As shown in FIGS. 8–10, a center tear line 31 extending in the lateral direction when viewed from the occupant sitting on the front seat, a left tear line 32, and a right tear line 33 continuing from the left end and the right end of the tear line 31 are provided on the back surface of a lid 30 of the airbag apparatus. The tear lines 31 to 33 are formed of grooves provided on the back surface of the lid 30. The left tear line 32 and the right tear line 33 extend both upward and downward from the center tear line 31. A hinged portion 34 extends between the upper end of the left tear line 32 and the upper end of the right tear line 33, and a hinged portion 34 extends between the lower end of the left tear line 32 and the lower end of the right tear line 33.

The intersecting angles $\theta$ ($\theta_1$, $\theta_2$, $\theta_3$, $\theta_4$) of the left and right tear lines 32, 33 with respect to the center tear line 31 are all acute angles and are preferably between 30° and 80°. The angles $\theta_1$ to $\theta_4$ may be all the same angle, or may be different.

The lid 30 is preferably formed of synthetic resin such as polypropylene. A superficial skin such as polyvinyl chloride or thermoplastic polyurethane may be provided on the surface thereof.

When the gas generator is actuated and the airbag is deployed, the lid 30 is pressed by the airbag and the lid 30 is torn along the tear lines 31, 32, 33. Then, as shown in FIG. 8(*b*), the flaps 35 open like hinged double doors, and thus an opening is formed on the lid 30. The airbag passes through the opening and deploys toward the front of the occupant sitting on the front seat.

As shown in FIGS. 9 and 10, in the airbag apparatus according to this embodiment, a case 40, preferably formed of metal or synthetic resin, is disposed on the back surface of the lid 30, preferably formed of synthetic resin. The case 40 includes a square tubular frame portion 41 and a mounting wall 42. The mounting wall 42 extends outward from the side edge of the frame portion 41 on the lid 30 side of the frame portion 41 like a flange. The lid side of the frame portion 41 is the upper end in FIG. 9 (lower end in FIG. 10). The upper surface in FIG. 9 of the mounting wall 42 abuts against the back surface of the lid 30. A plurality of locking holes 43 for locking a hook 61 (FIG. 9) are provided on a pair of opposing surfaces of the frame portion 41.

An inner member 50, preferably formed of synthetic resin, is fitted in the case 40. The inner member 50, being angular C-shape in cross-section, includes a substantially rectangular main surface portion 51 and a pair of leg strips 52 extending upright from a pair of opposing longer sides of the main surface portion 51. The main surface portion 51 overlaps with the back surface of the lid 30, and is joined to the lid 30, for example, by adhesion or welding. The leg strips 52 overlap with the inner surface of the frame portion 41 of the case 40. The leg strips 52 are provided with locking holes 53 at the positions corresponding to the locking holes 43 of the case 40. A tear line 54 is formed on the lower surface in FIG. 9 of the main surface portion 51 so as to overlap with the center tear line 31 of the lid 30, as shown in FIG. 9.

As shown in FIG. 10, the main surface portion 51 is octagonal shape and is formed by cutting four corners of a rectangle away. The portion of the leg strip 52 adjacent to the corner of the main surface portion 51 is partially cut away.

As shown in FIG. 9, a plurality of hooks 61 are formed around the outer periphery of the container 60, which is a shape of a box without a lid, and the hooks 61 are locked by being inserted into the locking holes 53 of the inner member 50 and the locking holes 43 on the case 40. A gas generator 64 is disposed on the bottom side in FIG. 9 of the container 60. The airbag 62 is folded and stored in the container 60, and the proximal end of the airbag 62 is fixed to the inner surface of the container 60 by a fixing member 63.

Figure 11:
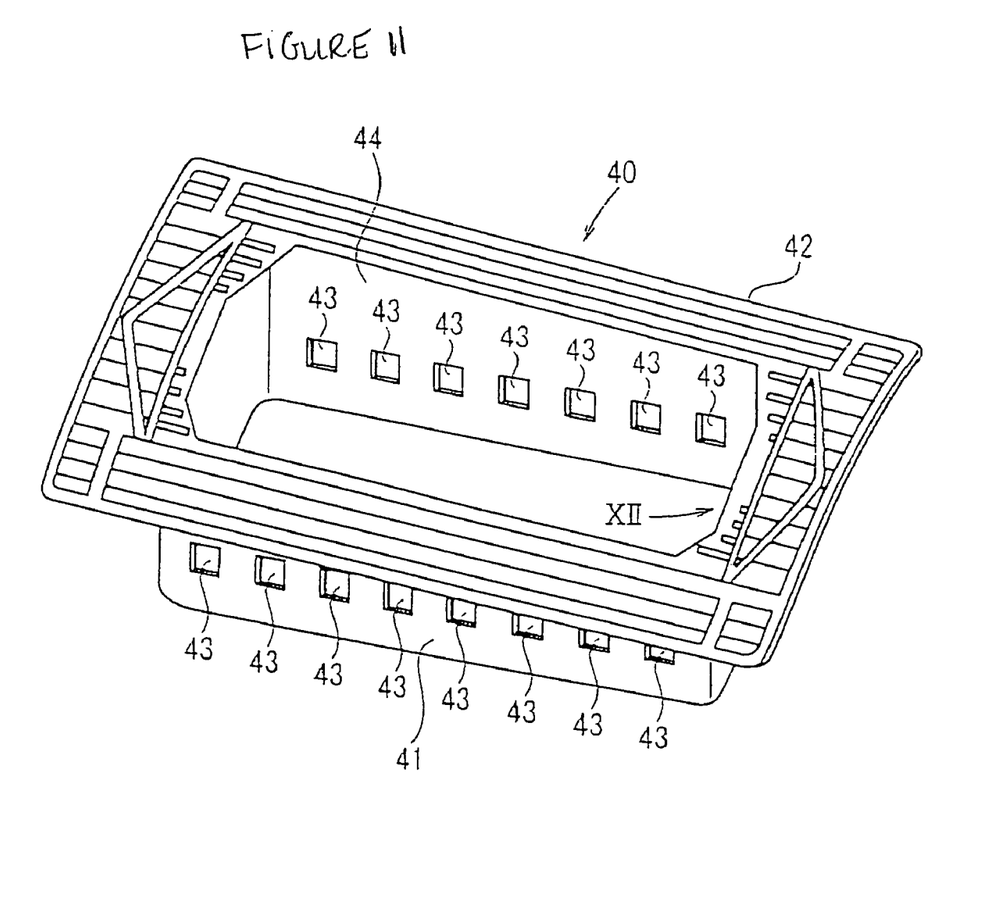
FIG. 11 is a front perspective view of the airbag apparatus of FIG. 10.
Figure 12:
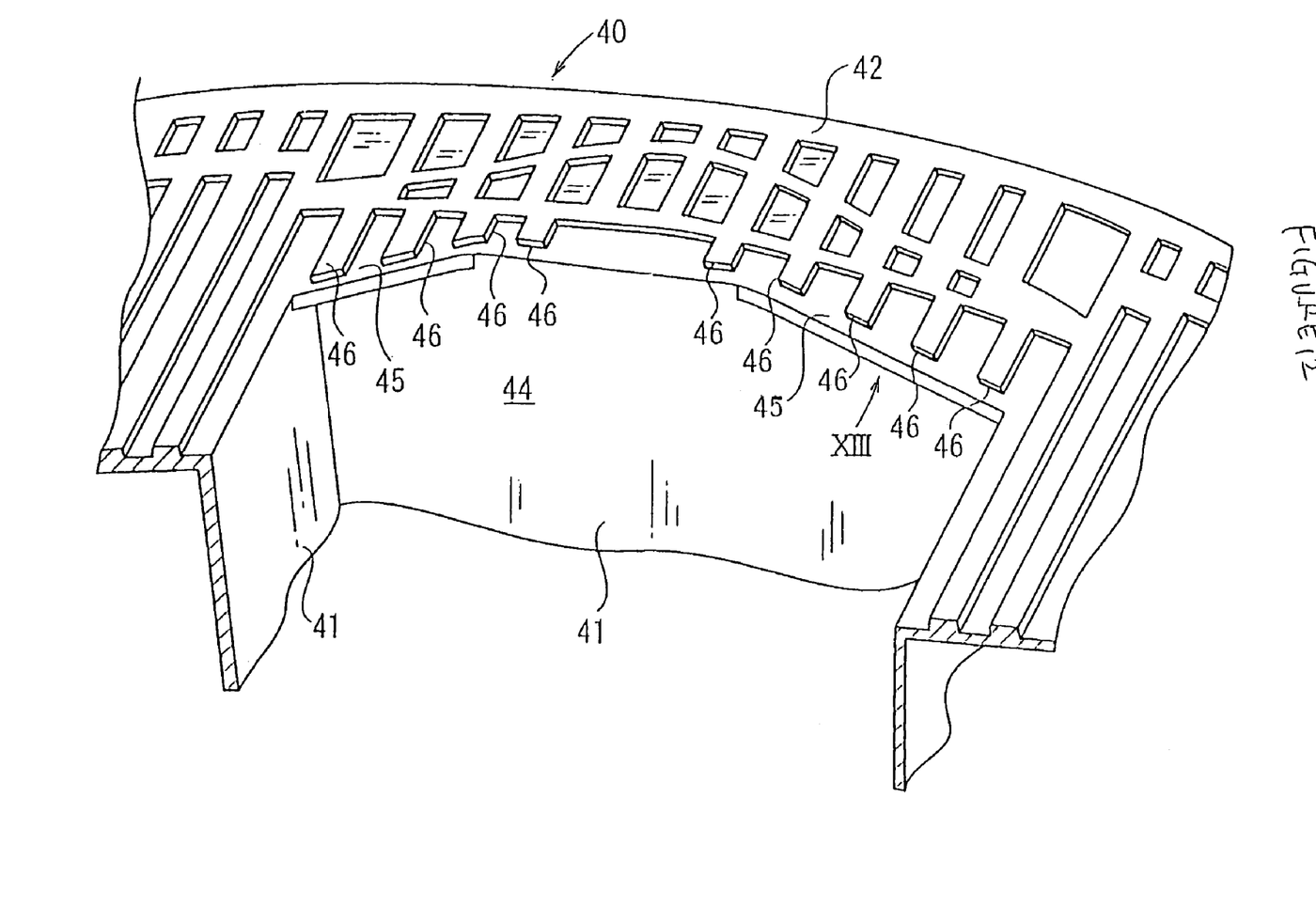
FIG. 12 is an exploded perspective view of portion XII in FIG. 11.
Figure 13:
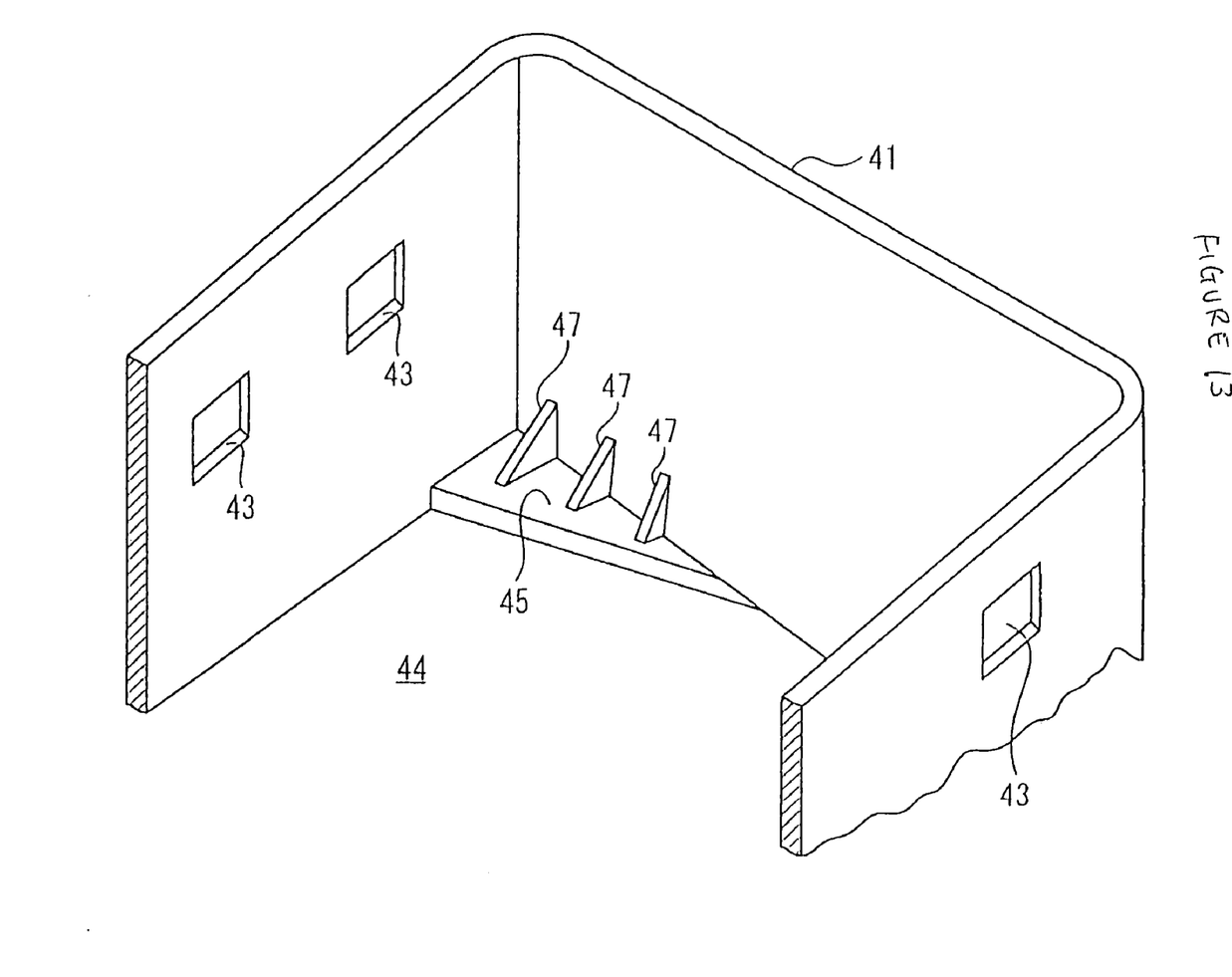
FIG. 13 is a rear perspective view of portion XIII in FIG. 12.

Referring now to FIGS. 11–13, the shape of the case 40 will now be described.

Overhanging strips 45, being right triangle in shape and overhanging inwardly of the frame portion 41, are provided at four corners of the frame portion 41 on the lid 30 side (upper side in FIGS. 11, 12). In this manner, since the overhanging strips 45 are overhanging inwardly from the corners of the frame portion 41, an opening 44 on the lid 30 side of the case 40, that is, on the side where the mounting wall 42 is provided, is octagonal in shape. The surfaces of the overhanging strips 45 on the lid 30 side are formed with a plurality of rows of ribs 46 for reinforcing the overhanging strips 45. As shown in FIG. 13, the back surface of the overhanging strip 45 is provided with backside ribs 47 of right triangle in shape connecting the back surface of the overhanging strip 45 and the inner surface of the frame portion 41.

Subsequently, referring to FIG. 14, a positional relation between the tear lines 31–33 formed on the lid 30, the hinged portions 34, an opening 44 of the case 40, and the overhanging strips 45 is described. Though FIG. 14 is a front view of the airbag apparatus viewed from the front seat side, for the sake of clarity of the drawings, the tear lines 31–33 and the hinged portions 34, which are provided on the front side, are represented by solid lines.

Figure 14:
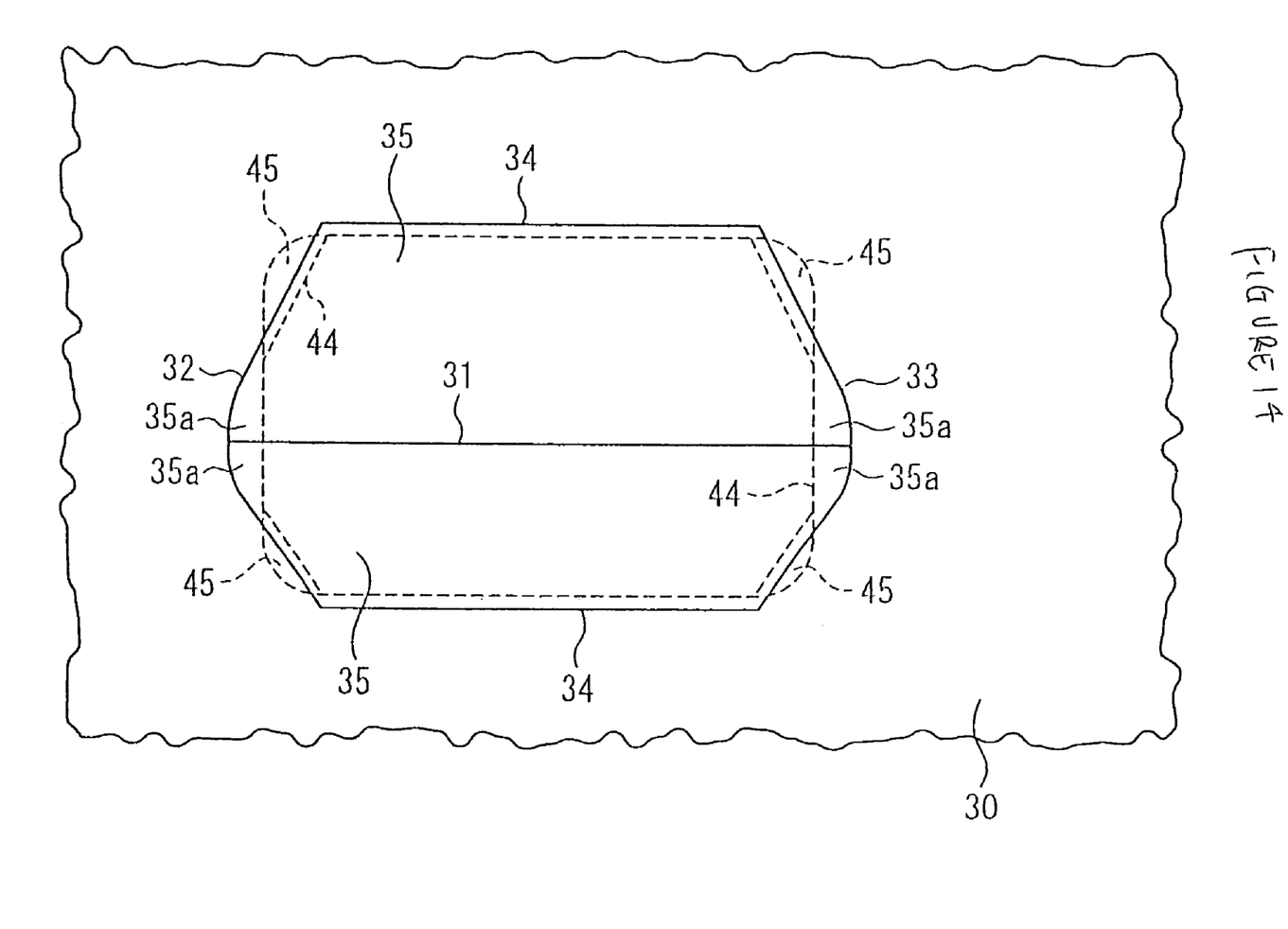
FIG. 14 is an explanatory top view illustrating a positional relationship between an opening of the case and the tear lines.

The left tear line 32 of the lid 30 is extended so as to overlap the overhanging strips 45 provided at two corners of the opening 44 on the left side in FIG. 14. In the same manner, the right tear line 33 of the lid 30 is extended so as to overlap the overhanging strips 45 provided at two corners of the opening 44 on the right side in FIG. 14.

The upper flap 35 is defined by the center tear line 31, the upper hinged portion 34 in FIG. 14, the left tear line 32 connecting the left end of the hinged portion 34 and the left end of the center tear line 31, and the right tear line 33 connecting the right end of the hinged portion 34 and the right end of the center tear line 31. The lower flap 35 is defined by the center tear line 31, the lower hinged portion 34 in FIG. 14, the left tear line 32 connecting the left end of the hinged portion 34 and the left end of the center tear line 31, and the right tear line 33 connecting the right end of the hinged portion 34 and the right end of the center tear line 31.

The portion of the back surfaces of the flaps 35 on the inner side of the opening 44 are reinforced by lining that is, for example, adhered or welded with the main surface potion 51 of the inner member 50. The portions of the back surfaces of the flaps 35 outside of the opening 44 are not covered with the main surface portion 51 of the inner member 50 and thus are not reinforced by the main surface portion 51. In other words, although the end portions 35a of the flaps 35 and extremely narrow portions of the side edges of the flaps 35 along the left tear line 32, the right tear line 33, and the hinged portions 34 are not lined by the main surface portion 51 of the inner member 50, remaining major portions of the flaps 35 are reinforced by lining by the main surface portion 51.

Subsequently, an operation of the airbag apparatus thus constructed will be described.

When the gas generator 64 is actuated and starts to inject gas in association with a collision of the motor vehicle, and the airbag 62 starts to be deployed. The airbag 62 presses the main surface portion 51 of the inner member 50 and the lid 30 from the backside, and the main surface portion 51 and the lid 30 are torn along their tear lines 31–33, 54. Then the flaps 35 open toward the cabin side, and the airbag 62 is deployed in the cabin.

In the airbag apparatus according to this embodiment, since the intersecting angles θ of the left and the right tear lines 32, 33 with respect to the center tear line 31 are acute angles, no hangnail is generated along the flap 35.

In this embodiment, when the lid 30 is composed of, for example, synthetic resin, the lid 30 is liable to be brittle if exposed to a condition such as an environment at extremely low temperatures. However, since the main surface portion 51 of the inner member 50 is reinforced by lining by joining the main surface portion 51 of the inner member 50 by the major portions of the flaps 35 of the lid 30, the flap 35 is high in strength, whereby the flaps 35 cannot be broken even when a large force is exerted to the flaps 35 when being opened.

Although the end portion 35a and extremely narrow portions on the side edges of the flaps 35 formed on the lid 30 are not lined by the main surface portion 51 of the inner member 50, since the end portions 35a and the side edges are extremely small (narrow), these portions cannot be broken even when a large force is exerted thereon when being opened.

In other words, according to this embodiment, since the intersecting angles θ of the left and the right tear lines 32, 33 with respect to the center tear line 31 are acute angles, assuming that the tear lines 31–33 are formed outside the opening 44 without providing the overhanging strips 45 at four corners of the opening 44 of the case 40, the area of the end portions 35a is large. However, in this embodiment, since the overhanging strips 45 are provided at the four corners of the opening 44 of the case 40, and the left and the right tear lines 32, 33 of the lid 30 extend across the overhanging strip 45, the area of the end portions 35a of the flaps 35 running outward (rightward and leftward) over the frame-shaped case 40 is small. Therefore, even when the end portions 35a are not lined by the main surface portion 51 of the inner member 50, the flaps cannot be broken when being opened.

The overhanging strips 45 overhang toward the center of the frame-shaped case 40, and thus the airbag 62 is brought into friction so as to be stuck thereon when the airbag 62 is deployed, and thus a large force is exerted thereon. However, in this embodiment, since the ribs 46 and the backside ribs 47 for reinforcing the overhanging strips 45 are provided on the front surface and the back surface of the overhanging strips 45, the overhanging strips 45 can sufficiently resist a force exerted in association with friction with respect to the airbag 62. In particular, the backside ribs 47 are right triangle in shape, and thus the airbag 62 that is being deployed is guided toward the center of the frame-shaped case 40 by the backside rib 47. Therefore, the airbag 62 hardly gets stuck on the overhanging strips 45, and thus the airbag 62 can be deployed smoothly.

Figure 15:
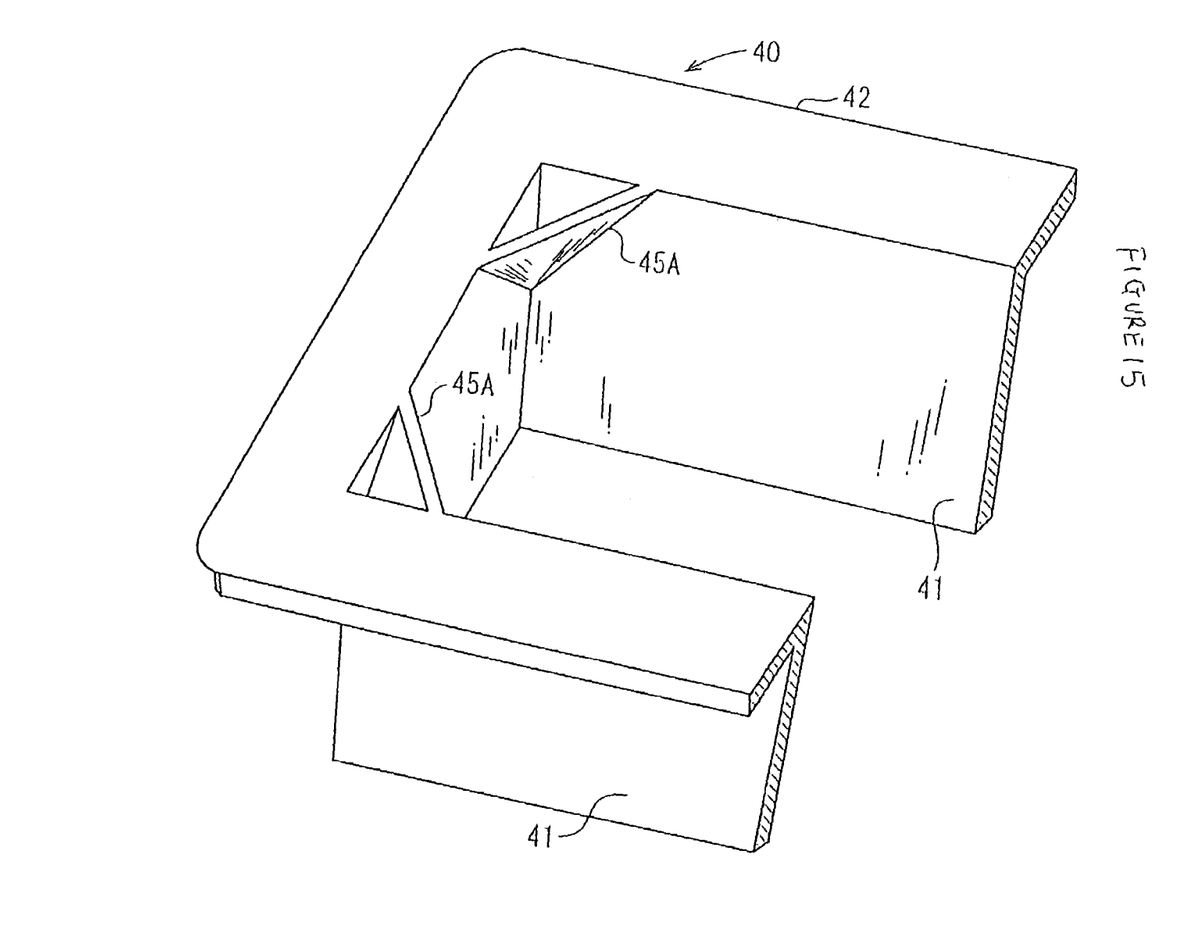
FIG. 15 is a perspective view showing a case of an airbag apparatus according to an embodiment of the present invention.

In the embodiment described above, though the overhanging strips 45 are right triangle in shape overhanging inwardly from the corner of the case 40 and the ribs and the backside ribs 47 are provided on both surfaces, the shape of the overhanging strips is not limited thereto and, for example, they may be overhanging strips 45A having a shape obliquely intersecting the frame portion 41 as shown in FIG. 15. The overhanging strips 45A have a function to allow the airbag to be deployed smoothly by guiding the airbag toward the center of the case 40 when being deployed (a function corresponding to the backside ribs 47 in the above-described embodiment).

The priority documents, Japanese Patent Application No. 2002-297643, filed Oct. 10, 2002, and Japanese Patent Application No. 2003-187869, filed Jun. 30, 2003, are hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A lid body for an airbag apparatus comprising:
   a lid body, and
   a tear line disposed on a surface of the lid body;
   wherein the tear line includes a center tear line including left and right ends and extending in a lateral direction along the surface of the lid body, a left tear line intersecting with the left end of the center tear line, and a right tear line intersecting with the right end of the center tear line;
   wherein the angles formed by the left and right tear lines and the center tear line are acute angles;

wherein the left tear line includes an upper left tear line and a lower left tear line and the right tear line includes an upper right tear line and a lower right tear line;

wherein angles of intersection between the upper left and upper right tear lines and the center tear line are smaller than the angles of intersection between the lower left and lower right tear lines and the center tear line.

2. A lid body for an airbag apparatus according to claim 1, wherein the left tear line and the right tear line extend in intersecting directions.

3. A lid body for an airbag apparatus according to claim 1, wherein an angle of intersection between the upper left tear line and the lower left tear line is 60 degrees or greater and less than 180 degrees.

4. A lid body for an airbag apparatus according to claim 1, wherein an angle of intersection between the upper right tear line and the lower right tear line is 60 degrees or greater and less than 180 degrees.

5. A lid body for an airbag apparatus according to claim 1, wherein the angles of intersection between the upper left and right tear lines and the center tear line are substantially equal;

wherein the angles of intersection between the lower left and right tear lines and the center tear line are substantially equal.

6. A lid body for an airbag apparatus according to claim 1, wherein the tear line includes a groove disposed on a back surface of the lid body.

7. An airbag apparatus for protecting an occupant of a vehicle comprising:

an airbag, an inflator for supplying inflation gas for deploying the airbag toward the occupant, and a lid configured to cover the airbag, wherein the lid includes a lid body and a tear line disposed on a surface of the lid body;

wherein the tear line includes a center tear line extending in a lateral direction along the surface of the lid body, a left tear line continuing from a left end of the center tear line, and a right tear line continuing from a right end of the center tear line;

wherein the left tear line and the right tear line extend in intersecting directions;

wherein the left tear line includes an upper left tear line and a lower left tear line and the right tear line includes an upper right tear line and a lower right tear line;

wherein an angle of intersection between the left tear line and the center tear line is an acute angle and an angle of intersection between the right tear line and the center tear line is an acute angle;

wherein angles of intersection between the upper left and upper right tear lines and the center tear line are smaller than the angles of intersection between the lower left and lower right tear lines and the center tear line.

8. An airbag apparatus for protecting an occupant of a vehicle according to claim 7, further comprising a housing disposed on a back surface of the lid body, wherein the housing forms an opening configured to fit within a boundary defined by the left and right tear lines of the lid body and extends from the lid body in a direction opposite an airbag deployment direction.

9. An airbag apparatus for protecting an occupant of a vehicle according to claim 8, further comprising an inner member disposed inside the housing.

10. An airbag apparatus for protecting an occupant of a vehicle according to claim 9, wherein the inner member has a main surface portion joined to the lid body.

11. An airbag apparatus for protecting an occupant of a vehicle according to claim 10, wherein the inner member has a leg strip extending outwardly from the main surface portion and overlapping with an inner surface of the housing.

12. An airbag apparatus for protecting an occupant of a vehicle according to claim 10, wherein the main surface portion includes a tear line overlapping the center tear line on the lid body.

13. An airbag apparatus for protecting an occupant of a vehicle according to claim 8, further comprising a plurality of overhanging strips disposed at corners of the housing closest to the lid body, wherein the overhanging strips extend inwardly into an interior of the housing.

14. An airbag apparatus for protecting an occupant of a vehicle according to claim 13, wherein the right tear line and the left tear line of the lid body overlap the overhanging strips.

15. An airbag apparatus for protecting an occupant of a vehicle according to claim 13, further comprising a plurality of rows of ribs configured to reinforce the overhanging strips.

16. An airbag apparatus for protecting an occupant of a vehicle according to claim 15, further comprising a second plurality of ribs, wherein the second plurality of ribs have a substantially triangular shape configured to connect a back surface of the overhanging strips and an inner surface of the housing.

17. An airbag apparatus for protecting an occupant of a vehicle according to claim 16, wherein a hypotenuse of a triangle of the substantially triangular shaped ribs obliquely intersect the back surface of the overhanging strips and the inner surface of the housing.

18. An airbag apparatus for protecting an occupant of a vehicle comprising:

an airbag, an inflator for supplying inflation gas for deploying the airbag toward the occupant, a housing that includes an opening through which the airbag deploys toward the occupant, and a lid configured to cover the airbag and the housing, and including a tear line disposed on a surface of the lid;

wherein the tear line includes a center tear line extending in a lateral direction along the surface of the lid, a left tear line intersecting with a left end of the center tear line, and a right tear line intersecting with a right end of the center tear line;

wherein the entire length of the left and right tear lines overlie the housing outside of the perimeter of the opening;

wherein the angles formed by the left and right tear lines and the center tear line are acute angles.

* * * * *